(12) United States Patent
Zhu

(10) Patent No.: US 6,230,389 B1
(45) Date of Patent: May 15, 2001

(54) METHOD FOR FABRICATING A MAGNETORESISTIVE (MR) STRIPE HEIGHT LAPPING MONITOR WITH IMPROVED LINEARITY

(75) Inventor: Li-Yan Zhu, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 09/195,649

(22) Filed: Nov. 19, 1998

(51) Int. Cl.$^7$ ........................................ G11B 5/42
(52) U.S. Cl. ................ 29/603.1; 29/603.12; 29/603.14; 29/603.15; 451/5; 451/8
(58) Field of Search ................ 29/603.12, 603.14, 29/603.15, 603.09, 603.1; 360/113; 451/1, 5, 8, 9

(56) References Cited

U.S. PATENT DOCUMENTS

| | | | |
|---|---|---|---|
| 3,967,368 | * 7/1976 | Brock et al. | 29/603.14 |
| 5,065,483 | 11/1991 | Zammit | 29/603 |
| 5,210,667 | 5/1993 | Zammit | 360/113 |
| 5,559,429 | 9/1996 | Mowry et al. | 324/71.5 |
| 5,654,854 | 8/1997 | Mallary | 360/113 |
| 5,708,370 | 1/1998 | Shibata et al. | 324/689 |
| 5,772,493 | 6/1998 | Rottmayer et al. | 451/5 |

* cited by examiner

Primary Examiner—Carl E. Hall
(74) Attorney, Agent, or Firm—George O. Saile; Stephen B. Ackerman

(57) ABSTRACT

A method for forming a magnetoresistive (MR) lapping monitor, and a magnetoresistive (MR) lapping monitor formed employing the method. To practice the method, there is first provided a substrate. There is then formed over the substrate a patterned magnetoresistive (MR) layer, where the patterned magnetoresistive (MR) layer has a concavity at an edge of the patterned magnetoresistive (MR) layer opposite an air bearing surface (ABS) edge of the patterned magnetoresistive (MR) layer. There is then formed covering the edge of the patterned magnetoresistive (MR) layer opposite the air bearing surface edge of the patterned magnetoresistive (MR) layer and separated by the concavity a pair of patterned conductor lead layers, where neither patterned conductor lead layer within the pair of patterned conductor lead layers reaches a plane defined by the air bearing surface (ABS) edge of the patterned magnetoresistive (MR) layer. The method contemplates a magnetoresistive (MR) lapping monitor fabricated employing the method. The magnetoresistive (MR) lapping monitor contemplates a method for forming a magnetoresistive (MR) sensor element, with precise patterned magnetoresistive (MR) layer stripe height, while employing the magnetoresistive (MR) lapping monitor.

9 Claims, 3 Drawing Sheets

METHOD FOR FABRICATING A MAGNETORESISTIVE (MR) STRIPE HEIGHT LAPPING MONITOR WITH IMPROVED LINEARITY

BACKGROUND OF THE INVENTION

1. Field of the Invention

The present invention relates generally to methods for fabricating magnetic sensor elements. More particularly, the present invention relates to methods for fabricating magnetoresistive (MR) sensor elements.

2. Description of the Related Art

The recent and continuing advances in computer and information technology have been made possible not only by the correlating advances in the functionality, reliability and speed of semiconductor integrated circuits, but also by the correlating advances in the storage density and reliability of direct access storage devices (DASDs) employed in digitally encoded magnetic data storage and retrieval.

Storage density of direct access storage devices (DASDs) is typically determined as areal storage density of a magnetic data storage medium formed upon a rotating magnetic data storage disk within a direct access storage device (DASD) magnetic data storage enclosure. The areal storage density of the magnetic data storage medium is determined largely by the track width, the track spacing and the linear magnetic domain density within the magnetic data storage medium. The track width, the track spacing and the linear magnetic domain density within the magnetic data storage medium are in turn determined by several principal factors, including but not limited to: (1) the magnetic read-write characteristics of a magnetic read-write head employed in reading and writing digitally encoded magnetic data from and into the magnetic data storage medium; (2) the magnetic domain characteristics of the magnetic data storage medium; and (3) the separation distance of the magnetic read-write head from the magnetic data storage medium.

With regard to the magnetic read-write characteristics of magnetic read-write heads employed in reading and writing digitally encoded magnetic data from and into a magnetic data storage medium, it is known in the art of magnetic read-write head fabrication that magnetoresistive (MR) sensor elements employed within magnetoresistive (MR) read-write heads are generally superior to other types of magnetic sensor elements when employed in retrieving digitally encoded magnetic data from a magnetic data storage medium. In that regard, magnetoresistive (MR) sensor elements are generally regarded as superior since magnetoresistive (MR) sensor elements are known in the art to provide high output digital read signal amplitudes, with good linear resolution, independent of the relative velocity of a magnetic data storage medium with respect to a magnetoresistive (MR) read-write head having the magnetoresistive (MR) sensor element incorporated therein.

While magnetoresistive (MR) sensor elements are thus desirable within the art of digitally encoded magnetic data storage and retrieval, magnetoresistive (MR) sensor elements are nonetheless not entirely without problems within the art of digitally encoded magnetic data storage and retrieval. In particular, as patterned magnetoresistive (MR) layers within magnetoresistive (MR) sensor elements become smaller in dimension, it becomes increasingly more important and more difficult to reliably form those patterned magnetoresistive (MR) layers with a precise and limited stripe height while employing lapping methods as are conventional in the art of magnetoresistive (MR) sensor element fabrication.

It is thus towards the goal of providing, for use when fabricating magnetoresistive (MR) sensor elements, methods for reliably forming patterned magnetoresistive (MR) layers with precise and limited stripe height that the present invention is directed.

Various methods and resultant magnetoresistive (MR) sensor element structures have been disclosed in the art of magnetoresistive (MR) sensor element fabrication for forming patterned magnetoresistive (MR) layers with desirable properties.

For example, Zammit, in U.S. Pat. No. 5,065,483 and U.S. Pat. No. 5,210,667 discloses a method, and a magnetoresistive (MR) sensor element fabricated in accord with the method, where the magnetoresistive (MR) sensor element has formed therein a patterned magnetoresistive (MR) layer with precise stripe height. To achieve that result, the method employs a magnetoresistive (MR) lapping monitor employing a lapped resistive layer and an unlapped standard resistive layer such that measurement of a difference in resistance between the lapped resistive layer and the untapped standard resistive layer provides for control of a lapping method which simultaneously provides within the magnetoresistive (MR) sensor element the patterned magnetoresistive (MR) layer with the precise stripe height.

In addition, Mowry et al., in U.S. Pat. No. 5,559,429 analogously also discloses a system for lapping within a magnetoresistive (MR) sensor element a patterned magnetoresistive (MR) layer to a precise stripe height. The method employs a magnetoresistive (MR) lapping monitor comprising a lapped resistive layer, an untapped target resistive layer and an untapped reference resistive layer, such that measurement of differences in resistance between the lapped resistive layer in conjunction with the untapped target resistive layer and the untapped reference resistive layer provides for control of a lapping method which simultaneously provides within the magnetoresistive (MR) sensor element the patterned magnetoresistive (MR) layer with the precise stripe height.

Further, although not specifically directed to a magnetoresistive (MR) lapping monitor or a lapping method for forming a patterned magnetoresistive (MR) layer with a precise stripe height within a magnetoresistive (MR) sensor element, Mallary, in U.S. Pat. No. 5,654,854, discloses a magnetoresistive (MR) sensor element wherein a central portion of an edge of a patterned magnetoresistive (MR) layer opposite an air bearing surface edge of the patterned magnetoresistive (MR) layer is formed with a concavity. The patterned magnetoresistive (MR) layer so formed with the concave edge opposite the air bearing surface edge of the patterned magnetoresistive (MR) layer exhibits a single domain structure within the patterned magnetoresistive (MR) layer and thus provides attenuated Barkhausen noise within a magnetoresistive (MR) sensor element fabricated employing the patterned magnetoresistive (MR) layer.

Yet further, Shibata et al., in U.S. Pat. No. 5,708,370, discloses yet another magnetoresistive lapping monitor for forming within a magnetoresistive (MR) sensor element a patterned magnetoresistive (MR) layer with precise stripe height. The magnetoresistive (MR) lapping monitor employs both a continuously variable resistance lapped resistive layer and a discontinuously variable resistance lapped resistive layer, both of which are lapped simultaneously with the patterned magnetoresistive (MR) layer within the magnetoresistive (MR) sensor element.

Finally, Rottmayer et al., in U.S. Pat. No. 5,772,493, discloses a lapping control apparatus and a method for using the lapping control apparatus to control an offset of a patterned magnetoresistive (MR) layer with respect to a pair of magnetic shield layers which shield the patterned magnetoresistive (MR) layer within a magnetoresistive (MR) sensor element. The apparatus and method employ a magnetic excitation field which induces a variable current within the patterned magnetoresistive (MR) layer as a function of an offset distance of the patterned magnetoresistive (MR) layer with respect to the pair of magnetic shield layers when the pair of magnetic shield layers is lapped when forming the magnetoresistive (MR) sensor element.

Desirable in the art of magnetoresistive (MR) sensor element fabrication are additional methods which may be employed to form within magnetoresistive (MR) sensor element fabrications patterned magnetoresistive (MR) layers with precise stripe heights.

It is towards that goal that the present invention is directed.

SUMMARY OF THE INVENTION

A first object of the present invention is to provide a method for forming with precise stripe height a patterned magnetoresistive (MR) layer within a magnetoresistive (MR) sensor element.

A second object of the present invention is to provide a method in accord with the first object of the present invention, which method is readily manufacturable.

In accord with the objects of the present invention, there is provided by the present invention a method for forming a magnetoresistive (MR) lapping monitor. To practice the method of the present invention, there is first provided a substrate. There is then formed over the substrate a patterned magnetoresistive (MR) layer, where the patterned magnetoresistive (MR) layer has a concavity at an edge of the patterned magnetoresistive (MR) layer opposite an air bearing surface (ABS) edge of the patterned magnetoresistive (MR) layer. Finally, there is then formed covering the edge of the patterned magnetoresistive (MR) layer opposite the air bearing surface edge of the patterned magnetoresistive (MR) layer and separated by the concavity a pair of patterned conductor lead layers, where neither patterned conductor lead layer within the pair of patterned conductor lead layers reaches a plane defined by the air bearing surface (ABS) edge of the patterned magnetoresistive (MR) layer.

The method for forming the magnetoresistive (MR) lapping monitor of the present invention contemplates a magnetoresistive (MR) lapping monitor fabricated in accord with the method for forming the magnetoresistive (MR) lapping monitor. The method for forming the magnetoresistive (MR) lapping monitor of the present invention similarly also contemplates a method for fabricating a magnetoresistive (MR) sensor element employing the magnetoresistive (MR) lapping monitor of the present invention.

The present invention provides a method for forming, with precise stripe height, a patterned magnetoresistive (MR) layer within a magnetoresistive (MR) sensor element. The method of the present invention realizes the foregoing object by providing a magnetoresistive (MR) lapping monitor which may be employed for forming the patterned magnetoresistive (MR) layer within the magnetoresistive (MR) sensor element, where the magnetoresistive (MR) lapping monitor comprises: (1) a patterned magnetoresistive (MR) layer having a concavity at an edge of the patterned magnetoresistive (MR) layer opposite an air bearing surface (ABS) edge of the patterned magnetoresistive (MR) layer; and (2) a pair of patterned conductor lead layers formed covering the edge of the patterned magnetoresistive (MR) layer opposite the air bearing surface edge of the patterned magnetoresistive (MR) layer and separated by the concavity, where neither patterned conductor lead layer within the pair of patterned conductor lead layers reaches a plane defined by the air bearing surface (ABS) edge of the patterned magnetoresistive (MR) layer. By employing such a geometry and disposition of the patterned conductor lead layers with respect to the patterned magnetoresistive (MR) layer there is avoided a smearing of the patterned conductor lead layers when simultaneously lapping: (1) the patterned magnetoresistive (MR) layer within the magnetoresistive (MR) lapping monitor; and (2) a corresponding patterned magnetoresistive (MR) layer within a magnetoresistive (MR) sensor element. Such a smearing might otherwise provide an erroneous resistance measurement of the patterned magnetoresistive (MR) layer when lapping the patterned magnetoresistive (MR) layer within the magnetoresistive (MR) lapping monitor and consequently lap the corresponding patterned magnetoresistive (MR) layer within the magnetoresistive (MR) sensor element to an imprecise stripe height.

The method of the present invention is readily commercially implemented. The present invention employs methods and materials as are generally known in the art of magnetoresistive (MR) sensor element fabrication. Since it is a process control within the method of the present invention which provides at least in part the method of the present invention, rather than the existence of methods and materials which provides the method of the present invention, the method of the present invention is readily commercially implemented.

BRIEF DESCRIPTION OF THE DRAWINGS

The objects, features and advantages of the present invention are understood within the context of the Description of the Preferred Embodiment, as set forth below. The Description of the Preferred Embodiment is understood within the context of the accompanying drawings, which form a material part of this disclosure, wherein.

DESCRIPTION OF THE PREFERRED EMBODIMENT

Figure 1:
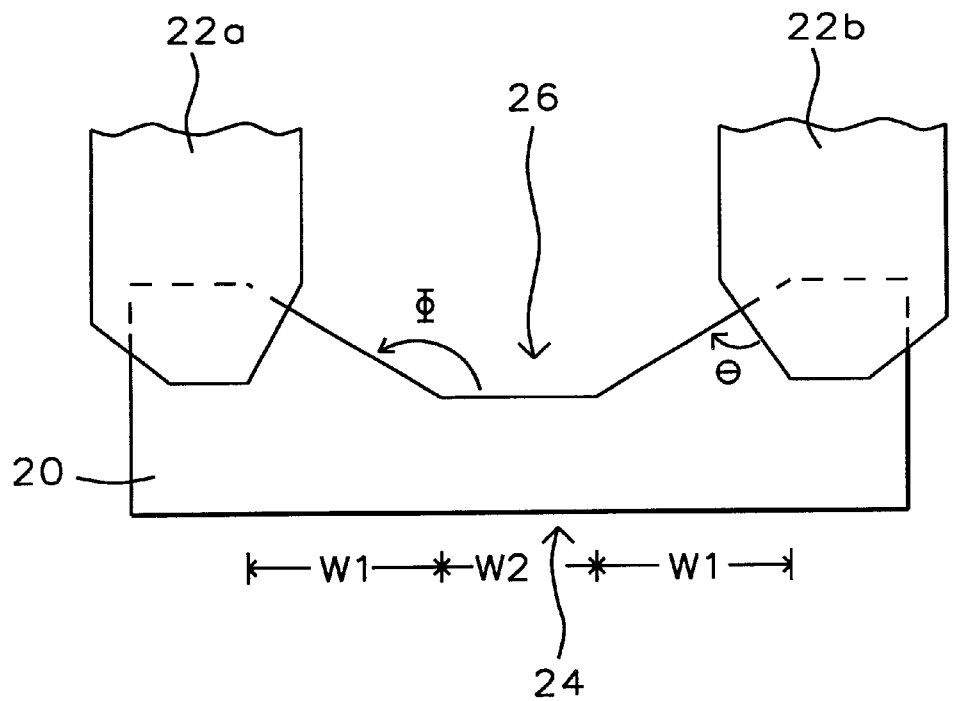
FIG. 1 shows a schematic plan view diagram of a magnetoresistive (MR) lapping monitor comprising a patterned magnetoresistive (MR) layer having formed thereupon a pair of patterned conductor lead layers in accord with a preferred embodiment of the present invention.

The present invention provides a method for reliably forming within a magnetoresistive (MR) sensor element a patterned magnetoresistive (MR) layer with precise stripe height. The method of the present invention realizes the foregoing object by employing when forming the magnetoresistive (MR) sensor element a magnetoresistive (MR) lapping monitor which comprises: (1) a patterned magnetoresistive (MR) layer having a concavity at an edge of the patterned magnetoresistive (MR) layer opposite an air bearing surface (ABS) edge of the patterned magnetoresistive (MR) layer; and (2) a pair of patterned conductor lead layers formed contacting the edge of the patterned magnetoresistive (MR) layer opposite the air bearing surface edge of the patterned magnetoresistive (MR) layer and separated by the concavity, where neither patterned conductor lead layer within the pair of patterned conductor lead layers reaches a plane defined by the air bearing surface (ABS) edge of the patterned magnetoresistive (MR) layer. Given such a disposition of the pair of patterned conductor lead layers with respect to the patterned magnetoresistive (MR) layer within the magnetoresistive (MR) lapping monitor, there is avoided any smearing of the patterned conductor lead layers when lapping the patterned magnetoresistive (MR) layer within the magnetoresistive (MR) lapping monitor and thus there is avoided any imprecision when simultaneously lapping a corresponding patterned magnetoresistive (MR) layer within a magnetoresistive (MR) sensor element which is simultaneously lapped with the patterned magnetoresistive (MR) layer within the magnetoresistive (MR) lapping monitor.

Although the preferred embodiment of the present invention illustrates the present invention within the context of forming with precise stripe height a patterned magnetoresistive (MR) layer for use within a single stripe magnetoresistive (SSMR) sensor element, the present invention may also be employed for forming magnetoresistive (MR) sensor elements including but not limited to single stripe magnetoresistive (SSMR) sensor elements, soft adjacent layer (SAL) magnetoresistive (MR) sensor elements and dual stripe magnetoresistive (DSMR) sensor elements which may be employed within magnetic heads including but not limited to merged inductive magnetic write magnetoresistive (MR) read magnetic read-write heads, non-merged inductive magnetic write magnetoresistive (MR) read magnetic read-write heads and magnetoresistive (MR) read only heads. The foregoing magnetic heads may be employed within magnetic data storage and transduction application including but not limited to digital magnetic data storage and transduction applications, which may include, but are not limited to, direct access storage device (DASD) digital magnetic data storage and transduction applications, as well as analog magnetic data storage and transduction applications.

Similarly, while the preferred embodiment of the present invention is directed towards fabricating a magnetoresistive (MR) sensor element for use within direct access storage device (DASD) digital magnetic data storage and transduction application, and reference is thus made to a first air bearing surface (ABS) of a first patterned magnetoresistive (MR) layer employed within the magnetoresistive (MR) sensor element and a second air bearing surface of a second patterned magnetoresistive (MR) layer employed within the magnetoresistive (MR) lapping monitor employed for forming the first patterned magnetoresistive (R) layer within the magnetoresistive (MR) sensor element, it is also understood by a person skilled in the art that the use of the term "air bearing surface (ABS)" within the disclosure of the present invention, including the claims, is intended to include a contact surface of a patterned magnetoresistive (MR) layer within a magnetoresistive (MR) sensor element to a magnetic data storage medium when the magnetoresistive (MR) sensor element is employed within a magnetic data storage medium contact recording apparatus or method.

Referring now to FIG. 1, there is shown a schematic plan view diagram of a magnetoresistive (MR) lapping monitor fabricated in accord with a preferred embodiment of the present invention.

Shown in FIG. 1 is a patterned magnetoresistive (MR) layer 20 having formed upon a pair of its opposite ends a pair of patterned conductor lead layers 22a and 22b. As illustrated within the schematic plan-view diagram of FIG. 1, the patterned magnetoresistive (MR) layer 20 has an air bearing surface (ABS) edge 24, which is therefore a lappable edge. At the edge of the patterned magnetoresistive layer 20 opposite the air bearing surface (ABS) edge 24 of the patterned magnetoresistive (MR) layer 20 there exists a concavity 26. As is similarly also illustrated within the schematic plan view diagram of FIG. 1 with respect to the pair of patterned conductor lead layers 22a and 22b, the pair of patterned conductor lead layers 22a and 22b is formed upon the patterned magnetoresistive (MR) layer 20 at the edge opposite the air bearing surface (ABS) edge 24 of the patterned magnetoresistive (MR) layer 20 and separated by the pair of patterned conductor lead layers is separated by concavity 26. As is finally illustrated within the schematic cross-sectional diagram of FIG. 1, neither patterned conductor lead layer 22a or 22b within the pair of patterned conductor lead layers 22a and 22b reaches the air bearing surface (ABS) edge 24 of the patterned magnetoresistive (MR) layer 20.

Within the preferred embodiment of the present invention, both the existence of the concavity 26 and the shape of the concavity 26 are significant to providing a magnetoresistive (MR) lapping monitor with improved performance. With respect to the existence of the concavity 26 within the patterned magnetoresistive (MR) layer 20, the patterned magnetoresistive (MR) layer 20 has a pair of end regions each preferably of width W1, and each preferably symmetric with respect to the other and terminating at an inner lower corner of each of the patterned conductor lead layers 22a and 22b, where the pair of end regions is separated by a central region of width W2 into which is defined, at least in part, the concavity 26. The width W1 of either of the end regions at the air bearing surface (ABS) edge 24 of the patterned magnetoresistive (MR) layer is preferably greater than the width W2 of the central region at the air bearing surface (ABS) edge 24 of the patterned magnetoresistive (MR) layer. Within the preferred embodiment of the present invention, the width W1 of either one of the end regions at the air bearing surface (ABS) edge 24 of the patterned magnetoresistive (MR) layer 20 is preferably from about 10 to about 40 microns, while the width W2 of the central region at the air bearing surface (ABS) edge 24 of the patterned magnetoresistive (MR) layer 20 is preferably from about 5 to about 20 microns.

With respect to the concavity 26 within the edge of the patterned magnetoresistive (MR) layer 20 opposite the air bearing surface (ABS) edge 24 of the patterned magnetoresistive (MR) layer 20, the concavity 26 may be any of several shapes, including but not limited to a "U" shaped concavity, a "U" shaped concavity with outward sloped sidewalls, a "V" shaped concavity and a "V" shaped concavity with a flattened bottom (as illustrated within the schematic plan view diagram of FIG. 1). A "V" shaped concavity, when precisely formed, may provide particular value in defining a constricted portion of the patterned magnetoresistive (MR) layer 20, although it may be difficult to form within a patterned magnetoresistive (MR) layer, such as the patterned magnetoresistive (MR) layer 20, such a precisely formed "V" shaped concavity, due to manufacturing tolerance limitations. Similarly, while a "U" shaped concavity may be more easily formed within a patterned magnetoresistive (MR) layer in accord with the present invention, under certain circumstances a "U" shaped concavity may also not be optimally preferred due to operational characteristics when forming and employing a magnetoresistive (MR) lapping monitor in accord with the present invention. Within the preferred embodiment of the present invention, the concavity 26 within the edge of the patterned magnetoresistive (MR) layer 20 opposite the air bearing surface (ABS) edge 24 of the patterned magnetoresistive (MR) layer 20 is preferably a "V" shape with a flattened bottom, as is illustrated within the schematic plan view diagram of FIG. 1. More preferably, such a "V" shaped concavity with the flattened bottom, as is illustrated within the schematic plan view diagram of FIG. 1 is formed with an angle $\Phi$ of from about 140 to about 175 degrees for each of the sidewall portions of the "V" with respect to flattened bottom portion of the "V", as is illustrated within the schematic plan view diagram of FIG. 1.

Within the present invention, the patterned magnetoresistive layer 20, due to its butterfly shape, will exhibit at least one of several improved properties when employed within the magnetoresistive (MR) lapping monitor whose schematic plan view diagram is illustrated in FIG. 1. The improved properties include improved linearity during lapping, as well as a shorter effective sensing length during lapping since upon lapping the air bearing surface (ABS) edge 24 of the patterned magnetoresistive (MR) layer 20, the resistance of the center region of the patterned magnetoresistive (MR) layer 20 becomes dominant in comparison with the end regions of the patterned magnetoresistive (MR) layer 20.

Also significant to the magnetoresistive (MR) lapping monitor whose schematic plan view diagram is illustrated in FIG. 1 is the geometry and positioning of each of the patterned conductor lead layers 22a and 22b upon the corresponding end regions of the patterned magnetoresistive (MR) layer 20. As is illustrated within the schematic plan view diagram of FIG. 1, it is significant that each of patterned conductor lead layers 22a and 22b be fabricated with dimensions such that the inner edges of each of the patterned conductor lead layers 22a and 22b make an angle $\Theta$ of about $\Phi/2$ degrees with the concavity 26 within the patterned magnetoresistive (MR) layer 20. Under such circumstances, manufacturing tolerances when forming the magnetoresistive (MR) lapping monitor whose schematic plan view diagram is illustrated within FIG. 1 are most readily compensated to minimally influence performance and measured resistance of the magnetoresistive (MR) lapping monitor whose schematic plan view diagram is illustrated in FIG. 1.

Although the preferred embodiment of the magnetoresistive (MR) lapping monitor of the present invnetion, as illustrated within the schematic plan view diagram of FIG. 1, illustrates the features of: (1) each patterned conductor lead layer 22a or 22b within the pair of patterned conductor lead layers 22a and 22b not reaching the air bearing surface (ABS) edge 24 of the patterned magnetoresistive (MR) layer 20; (2) the presence of the concavity 26; and (3) the angle $\Theta$ of about $\Phi/2$ degrees for disposition of an inner edge of each patterned conductor lead layer 22a or 22b with respect to the patterned magnetoresistive (MR) layer 20 (where the angle $\Phi$ is from about 140 to about 175 degrees), there may nonetheless also exist novelty within the present invention for a magnetoresistive (MR) lapping monitor having a subset of the foregoing three features.

Figure 2:
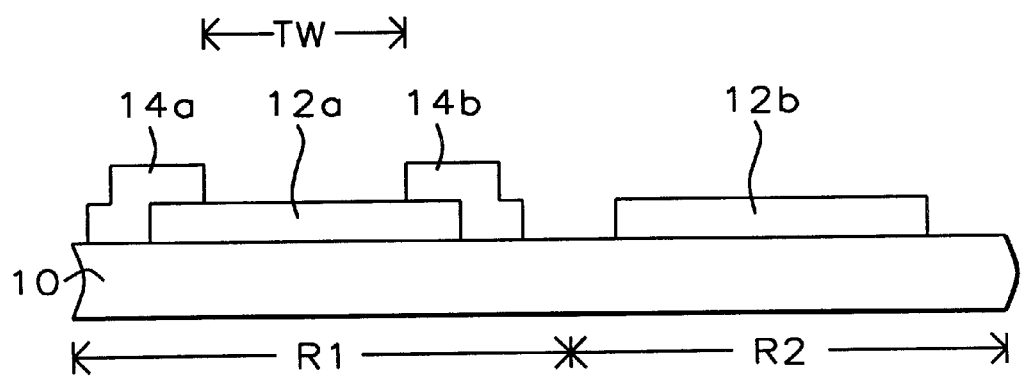
FIG. 2 shows a schematic air bearing surface (ABS) view diagram illustrating a magnetoresistive (MR) sensor element fabrication comprising a substrate, a portion of which has formed thereupon a magnetoresistive (MR) sensor element and an adjoining portion of which has formed thereupon a magnetoresistive (MR) lapping monitor, in accord with a preferred embodiment of the present invention.
Figure 3:
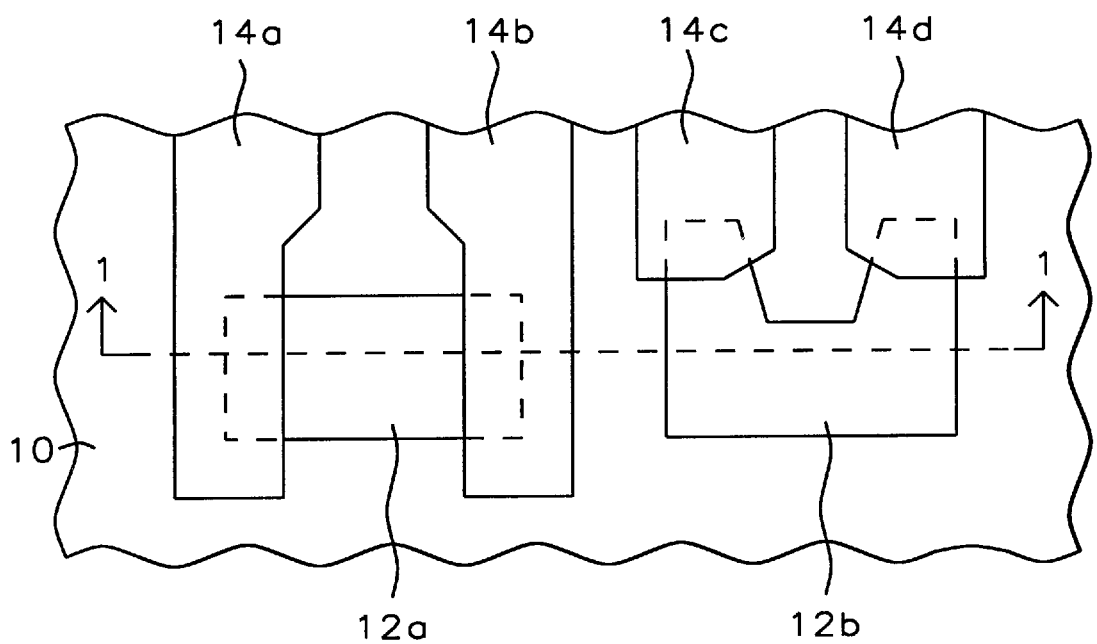
FIG. 3 shows a schematic plan view diagram corresponding with the schematic air bearing surface (ABS) view diagram of FIG. 2.
Figure 4:
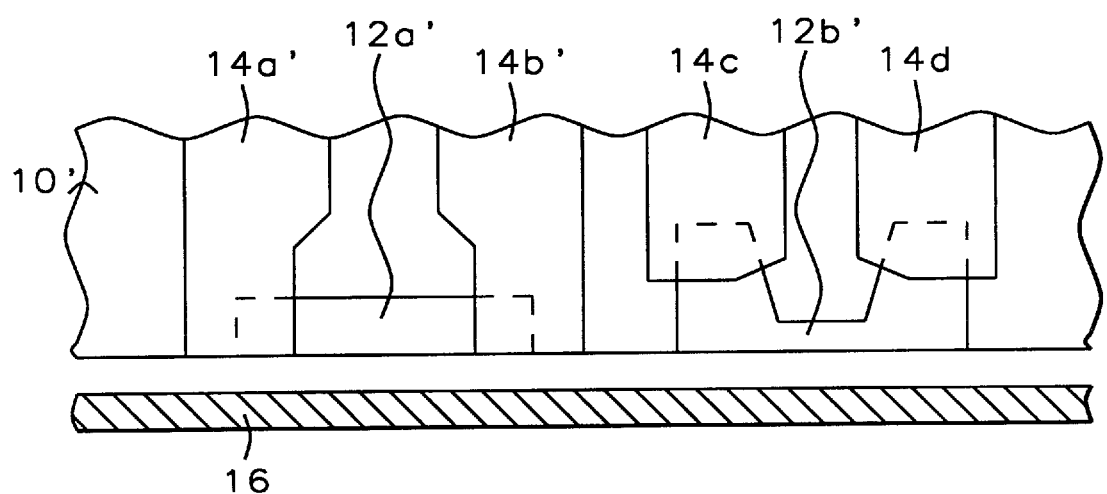
FIG. 4 shows a schematic plan view diagrams illustrating the results of a simultaneous lapping of the magnetoresistive (MR) sensor element and the magnetoresistive (MR) lapping monitor within the magnetoresistive (MR) sensor element fabrication whose schematic air bearing surface (ABS) view diagram is illustrated in FIG. 2.

Referring now to FIG. 2 to FIG. 4, there is shown a series of schematic air bearing surface (ABS) view and schematic plan view diagrams illustrating the results of progressive stages in processing a magnetoresistive (MR) sensor element fabrication to form therein a magnetoresistive (MR) sensor element having formed therein a patterned magnetoresistive (MR) layer with precise stripe height while employing a magnetoresistive (MR) lapping monitor in accord with a preferred embodiment of the present invention as illustrated within the schematic plan view diagram of FIG. 1. Shown in FIG. 2 is a schematic air bearing surface (ABS) view diagram of the magnetoresistive (MR) sensor element fabrication at an early stage in practice of the method of the present invention.

Shown in FIG. 2 is a substrate 10 having formed thereupon a first patterned magnetoresistive (MR) layer 12a and a second patterned magnetoresistive (MR) layer 12b, where the first patterned magnetoresistive (MR) layer 12a has a pair of first patterned conductor lead layers 14a and 14b formed covering and contacting a pair of opposite ends of the first patterned magnetoresistive (MR) layer 12a. The pair of first patterned conductor lead layers 14a and 14b defines a trackwidth TW of the first patterned magnetoresistive (MR) layer 12a. Preferably the trackwidth TW is from about 0.5 to about 2.0 microns. As is also illustrated within the schematic air bearing surface (ABS) view diagram of FIG. 2, the first patterned magnetoresistive (MR) layer 12a is formed upon a first region R1 of the substrate 10, where the first region R1 of the substrate 10 is a magnetoresistive (MR) sensor element region of the substrate. Similarly, the second patterned magnetoresistive (MR) layer 12b is formed upon a second region R2 of the substrate 10, where the second region R2 of the substrate 10 is a magnetoresistive (MR) lapping monitor region of the substrate 10 which subsequently also preferably serves as a kerf region of the substrate 10 which is consumed when parted from the first region R1 of the substrate. Within the preferred embodiment of the present invention, the patterned second magnetoresistive (MR) layer 12b is, as will subsequently be illustrated within a schematic plan-view diagram which follows, typically and preferably formed employing geometric constraints analogous or equivalent to the geometric constraints employed when forming the patterned magnetoresistive (MR) layer 20 within the magnetoresistive lapping monitor whose schematic plan view diagram is illustrated within FIG. 1.

Within the preferred embodiment of the present invention the substrate 10, the pair of patterned magnetoresistive (MR) layers 12a and 12b and the pair of first patterned conductor lead layers 14a and 14b may be formed employing methods and materials as are conventional in the art of magnetoresistive (MR) sensor element fabrication.

For example, although it is known in the art of magnetoresistive (MR) sensor element fabrication that substrates are typically formed from non-magnetic ceramic materials such as but not limited to oxides, nitrides, borides, carbides and both heterogeneous and homogeneous composite fabrications incorporating mixtures of oxides, nitrides, borides and carbides, for the preferred embodiment of the present invention, the substrate 10 is preferably formed of a non-magnetic aluminum oxide/titanium carbide ceramic material. Preferably, the substrate 10 so formed is formed with sufficient dimensions to allow the substrate 10 to be fabricated into a slider employed within a direct access storage device (DASD) magnetic data storage enclosure employed within digitally encoded magnetic data storage and retrieval, although, as noted above, a magnetoresistive (MR) sensor element formed in accord with the present invention may be employed within other digital magnetic data storage and transduction applications, as well as analog magnetic data storage and transduction applications.

Although not specifically illustrated within the schematic air bearing surface (ABS) view diagram of FIG. 2, although the substrate 10 is typically and preferably formed of a non-magnetic aluminum oxide-titanium carbide ceramic material, the substrate 10 will typically and preferably have formed upon its upper surface, and separated from the pair of patterned magnetoresistive (MR) layers 12a and 12b, any of several additional layers as are conventional in the art of magnetoresistive (MR) sensor element fabrication for forming a magnetoresistive (MR) sensor element which includes the first patterned magnetoresistive (MR) layer 12a. Such additional layers may include, but are not limited to undercoating layers, magnetic shield layers and non-magnetic spacer layers (both thermally conductive non-magnetic spacer layers and non-thermally conductive non-magnetic dielectric spacer layers) as are common in the art of magnetoresistive (MR) sensor element fabrication. Preferably, although not exclusively, the substrate 10 as illustrated within the schematic cross-sectional diagram of FIG. 2 will have an upper surface formed of a non-magnetic dielectric spacer layer, such as but not limited to an aluminum oxide dielectric layer, upon which is formed the pair of patterned magnetoresistive (MR) layers 12a and 12b.

Similarly, although it is also known in the art of magnetoresistive (MR) sensor element fabrication that magnetoresistive (MR) layers may be formed from any of several magnetoresistive (MR) soft magnetic materials, including but not limited to permalloy (ie: nickel-iron alloy) magnetoresistive (MR) soft magnetic materials and higher order alloy magnetoresistive (MR) soft magnetic materials incorporating permalloy magnetoresistive (MR) soft magnetic materials (i.e. nickel-iron-rhodium magnetoresistive (MR) soft magnetic materials and nickel-iron-chromium magnetoresistive (MR) soft magnetic materials), for the preferred embodiment of the present invention, the first patterned magnetoresistive (MR) layer 12a and the second patterned magnetoresistive (MR) layer 12b are each preferably formed of a permalloy (i.e. nickel-iron 80:20 w/w) magnetoresistive (MR) soft magnetic material. Preferably, the first patterned magnetoresistive (MR) layer 12a and the second patterned magnetoresistive (MR) layer 12b are each formed to a thickness of from about 75 to about 250 angstroms.

Similarly, although also not specifically illustrated within the schematic air bearing surface (ABS) view diagram of FIG. 1, it is also feasible and under certain circumstances preferred within the preferred embodiment of the present invention that either or both of the first patterned magnetoresistive (MR) layer 12a and the second patterned magnetoresistive (MR) layer 12b may have formed therebeneath and interposed between the substrate 10 a soft adjacent layer (SAL) transverse magnetic biasing layer separated from the pertinent patterned magnetoresistive (MR) layer 12a or 12b by a non-magnetic spacer layer. Similarly the soft adjacent layer (SAL) transverse magnetic biasing layer may have formed contacting its side opposite the pertinent patterned magnetoresistive (MR) layer 12a or 12b a hard biasing layer to provide optimal magnetic saturation of the soft adjacent layer (SAL) transverse magnetic biasing layer.

The soft adjacent layer (SAL) and the hard biasing layer, if present, may be formed employing methods and materials as are conventional in the art of magnetoresistive (MR) sensor element fabrication. For example, the soft adjacent layer (SAL) may be formed of soft magnetic materials analogous or equivalent to the soft magnetic materials employed for forming the patterned magnetoresistive (MR) layers 12a and 12b. Similarly, the hard biasing layer may be formed of hard magnetic biasing materials as are known in the art of magnetoresistive (MR) sensor element fabrication, such hard magnetic biasing materials including but not limited to antiferromagnetic hard magnetic biasing materials (such as but not limited to iron-manganese alloy antiferromagnetic magnetic biasing materials and nickel-manganese antiferromagnetic magnetic biasing materials), as well as permanent magnet hard magnetic biasing materials (such as but not limited to platinum-cobalt alloy permanent magnet magnetic biasing materials, higher order alloys incorporating platinum-cobalt alloy permanent magnet magnetic biasing materials, cobalt-chromium alloy permanent magnet magnetic biasing materials and rare earth alloy permanent magnet magnetic biasing materials). Preferably, the soft adjacent layer (SAL) if present, is formed to a thickness of from about 80 to about 200 angstroms, and a non-magnetic spacer layer interposed between the soft adjacent layer (SAL) and the first patterned magnetoresistive (MR) layer 12a, if present, is formed to a thickness of from about 75 to about 250 angstroms, while the hard bias layer, if present, is formed to a thickness of from about 100 to about 300 angstroms contacting the soft adjacent layer (SAL).

Within the preferred embodiment of the present invention with respect to the pair of first patterned conductor lead layers 14a and 14b, the pair of first patterned conductor lead layers 14a and 14 may be formed from any of several conductor lead materials as are conventional in the art of magnetoresistive (MR) sensor element fabrication, including but not limited to conductor lead materials selected from the group of conductor lead materials including but not limited to aluminum, aluminum alloy, copper, copper alloy, gold and gold alloy conductor lead materials. Preferably, each of the first patterned conductor lead layers 14a and 14b is formed to a thickness of from about 500 to about 1500 angstroms covering a pair of opposite ends of the first patterned magnetoresistive (MR) layer 12a.

Although not specifically illustrated within the schematic air bearing surface view diagram of FIG. 1, there is typically and preferably formed interposed between the pair of first patterned conductor lead layers 14a and 14b and contacting the first patterned magnetoresistive (MR) layer 12a a pair of patterned longitudinal magnetic biasing layers co-extensive with the pair of first patterned conductor lead layers 14a and 14b. The pair of patterned longitudinal magnetic biasing layers, if formed, may be formed of hard magnetic biasing materials as are known in the art of magnetoresistive (MR) sensor element fabrication, including but not limited to antiferromagnetic hard magnetic biasing materials (such as but not limited to iron-manganese alloy antiferromagnetic magnetic biasing materials and nickel-manganese alloy antiferromagnetic magnetic biasing materials), as well as permanent magnet hard magnetic biasing materials (such as but not limited to platinum-cobalt alloy permanent magnet magnetic biasing materials, higher order alloys incorporating platinum-cobalt alloy permanent magnet magnetic biasing materials, cobalt-chromium alloy permanent magnet magnetic biasing materials and rare earth alloy permanent magnet magnetic biasing materials). Preferably, each of the longitudinal magnetic biasing layers, if present, is formed of an antiferromagnetic magnetic biasing material, preferably an iron-manganese alloy (50:50, w/w) antiferromagnetic magnetic biasing material, preferably to a thickness of from about 100 to about 300 angstroms each.

Finally, although the schematic air-bearing surface (ABS) view diagram of FIG. 2 illustrates the pair of first patterned conductor lead layers 14a and 14b formed upon and covering a pair of opposite ends of the first patterned magnetoresistive layer 12a, it is also feasible within the present invention that a pair of patterned conductor lead layers, such as the pair of first patterned conductor lead layers 14a and 14b, either abuts or is formed beneath a first patterned magnetoresistive (MR) layer, such as the first patterned magnetoresistive (MR) layer 12a, provided that the pair of first patterned conductor lead layers makes electrical contact with a pair of opposite ends of the first patterned magnetoresistive (MR) layer to at least in part assist in defining a trackwidth of the first patterned magnetoresistive (MR) layer.

Referring now to FIG. 3, there is shown a schematic plan view diagram of a magnetoresistive (MR) sensor element fabrication corresponding with the magnetoresistive (MR) sensor element fabrication whose schematic air bearing surface (ABS) view diagram is illustrated in FIG. 2. Consistent with that which is illustrated within the schematic air bearing surface (ABS) view diagram of FIG. 2, there is illustrated within the schematic plan view diagram of FIG. 3 the substrate 10 having formed thereupon the first patterned magnetoresistive (MR) layer 12a and the second patterned magnetoresistive (MR) layer 12b. In turn, the first patterned magnetoresistive (MR) layer 12a has formed upon a pair of opposite ends of the first patterned magnetoresistive layer 12a the pair of first patterned conductor lead layers 14a and 14b, where each first patterned conductor lead layer 14a or 14b within the pair of first patterned conductor lead layers 14a and 14b reaches beyond a plane defined by a first air bearing surface (ABS) edge of the first patterned magnetoresistive (MR) layer 12a.

Similarly, and also consistent with that which is illustrated within the schematic air bearing surface (ABS) view diagram of FIG. 2, there is also illustrated within the schematic plan view diagram of FIG. 3 the second patterned magnetoresistive (MR) layer 12b which is employed within the magnetoresistive (MR) lapping monitor. As is illustrated within the schematic plan view diagram of FIG. 3, and consistent with the patterned magnetoresistive layer 20 within the magnetoresistive (MR) lapping monitor whose schematic plan view diagram is illustrated in FIG. 1, the second patterned magnetoresistive (MR) layer 12b is formed with a concavity at an edge of the second patterned magnetoresistive (MR) layer 12b opposite a second air bearing surface (ABS) edge of the second patterned magnetoresistive (MR) layer 12b. Finally, although not specifically illustrated within the schematic air bearing surface (ABS) view diagram of FIG. 2, there is formed contacting the edge of the second patterned magnetoresistive (MR) layer 12b opposite the second air bearing surface (ABS) edge of the second patterned magnetoresistive (MR) layer 12b and separated by the concavity a pair of second patterned conductor lead layers 14c and 14d, where neither second patterned conductor lead layer 14c or 14d within the pair of second patterned conductor lead layers 14c and 14d reaches a plane defined by the second air bearing surface (ABS) edge of the second patterned magnetoresistive (MR) layer 12b.

Although FIG. 3 illustrates the major portions of the first patterned magnetoresistive (MR) layer 12a and the second patterned magnetoresistive (MR) layer 12b as being formed of equivalent areal dimensions and having their corresponding air bearing surface (ABS) edges co-planar, such is not required within the present invention. Within the present invention, the areal dimensions of the first patterned magnetoresistive (MR) layer 12a and the second patterned magnetoresistive (MR) layer 12b need not be equivalent and the first air bearing surface (ABS) edge of the first patterned magnetoresistive (MR) layer 12a and the second air bearing surface (ABS) edge of the second patterned magnetoresistive (MR) layer 12b need not be coplanar. Sizes of the corresponding areal dimensions and locations of the corresponding air bearing surface (ABS) edges of the first patterned magnetoresistive (MR) layer 12a and the second patterned magnetoresistive (MR) layer 12b are preferably adjusted to optimize process control when subsequently simultaneously lapping the magnetoresistive (MR) sensor element which incorporates the first patterned magnetoresistive (MR) layer 12a and the magnetoresistive (MR) lapping monitor which incorporates the second patterned magnetoresistive (MR) layer 12b. In that regard, a height of the first patterned magnetoresistive (MR) layer 12a is typically determined within the context of limitations associated with monitoring a resistance of the first patterned magnetoresistive (MR) layer 12 during subsequent processing of the magnetoresistive sensor element fabrication whose schematic plan view diagram is illustrated in FIG. 3. Similarly, a height of the second patterned magnetoresistive (MR) layer 12b is typically determined within the context of limitations associated with monitoring of the height of the second patterned magnetoresistive (MR) 12b layer during lapping of the magnetoresistive sensor element fabrication whose schematic plan view diagram is illustrated in FIG. 3.

For the preferred embodiment of the present invention, the areal dimension of the second patterned magnetoresistive (MR) layer 12b is typically preferably greater than the areal dimension of the first patterned magnetoresistive (MR) layer 12a. Similarly, for example and without limitation, when the trackwidth TW of the first patterned magnetoresistive (MR) layer 12a is about 1 micron, an equivalent sensing length of the second patterned magnetoresistive (MR) layer 12b typically varies from about 50 to about 20 microns during lapping. In addition, also for example and without limitation, a height of the first patterend magnetoresistive (MR) layer 12a is typically from about 3 to about 6 microns, while a height of the second patterned magnetoresistive (MR) layer is about 20 microns. Finally, as will be discussed further below, the relative positioning of the edges of the first patterned magnetoresistive (MR) layer 12a and the second patterned magnetoresistive (MR) layer 12b opposite the air bearing surface edges of the first patterend magnetoresistive (MR) layer 12a and the second patterned magnetoresistive (MR) layer 12b is generally quite significant within the present invention.

With respect to the disposition of the pair of second patterned conductor lead layers 14c and 14d with respect to the second patterned magnetoresistive (MR) layer 12b, although as illustrated within the schematic plan view diagram of FIG. 3 it is desirable within the present invention that the pair of second patterned conductor lead layers 14c and 14d not reach the location of a minimum height of the second patterned magnetoresistive (MR) layer 12b within the concavity, the pair of second patterned conductor lead layers 14c and 14d may reach past that location. However, within the present invention, the pair of second patterned conductor lead layers 14c and 14d preferably does not reach sufficiently past the location of the minimum height of the second patterned magnetoresistive (MR) layer 12b within the concavity such that either one of the pair of second patterned conductor lead layers 14c and 14d is reached when the air bearing surface (ABS) of the second patterned magnetoresistive (MR) layer 12b is subsequently lapped.

Referring now to FIG. 4, there is shown a schematic plan view diagram of a magnetoresistive (MR) sensor element fabrication illustrating the results of further processing of the magnetoresistive (MR) sensor element fabrication whose schematic plan view diagram is illustrated within FIG. 3. Shown in FIG. 3 is a schematic plan view diagram of a magnetoresistive (MR) sensor element fabrication otherwise equivalent to the magnetoresistive (MR) sensor element fabrication whose schematic plan view diagram is illustrated in FIG. 2, but wherein the first air bearing surface (ABS) edge of the first patterned magnetoresistive (MR) layer 12a and the second air bearing surface (ABS) edge of the second patterned magnetoresistive (MR) layer 12b have been simultaneously lapped while employing a lapping block 16.

As is illustrated within the schematic plan-view diagram of FIG. 4, incident to lapping the first air bearing surface (ABS) edge of the first patterned magnetoresistive (MR) layer 12a and the second air bearing surface (ABS) edge of the second patterned magnetoresistive (MR) layer 12b: (1) the substrate 10 is lapped to form a lapped substrate 10'; (2) the first patterned magnetoresistive layer 12a is lapped to form a lapped first patterned magnetoresistive layer 12a'; (3) the second patterned magnetoresistive (MR) layer 12b is lapped to form a lapped second patterned magnetoresistive (MR) layer 12b'; and (4) the pair of first patterned conductor lead layers 14a and 14b is lapped to form a pair of lapped first patterned conductor lead layers 14a' and 14b'. As is also clearly illustrated within the schematic plan view diagram of FIG. 4, neither second patterned conductor lead layer 14c or 14d within the pair of second patterned conductor lead layers 14c and 14d is lapped, since neither of the second patterned conductor lead layers 14c and 14d reaches the second air bearing surface edge of the lapped second patterned magnetoresistive (MR) layer 12b'.

Since neither of the second patterned conductor lead layers 14c or 14d is lapped when forming the lapped second patterned magnetoresistive (MR) layer 12b', there is avoided a smearing of the conductor material from which is formed the second patterned conductor lead layers 14c and 14d onto the lapped second air bearing surface edge of the lapped second patterned magnetoresistive (MR) layer 12b'. In absence of a smearing of the conductor material from which is formed the second patterned conductor lead layers 14c and 14d onto the lapped second air bearing surface (ABS) edge of the lapped second patterned magnetoresistive (MR) layer 12b', the resistivity of the lapped second patterned magnetoresistive (MR) layer 12b' is more likely to be uniformly directly related to its lapping rate and its lapped height and thus serve effectively as a monitor for forming the lapped first patterned magnetoresistive (MR) layer 12a' of precise height within the magnetoresistive (MR) sensor element whose schematic plan view diagram is illustrated within FIG. 4. Thus, there is formed in accord with the present invention, for use within a magnetoresistive (MR) sensor element, a patterned magnetoresistive (MR) layer with precise stripe height.

Mathematical Analysis

In order to provide a better understanding of the features and advantages of a magnetoresistive (MR) lapping monitor formed in accord with the preferred embodiment of the present invention, there is presented the following mathematical analysis of resistance characteristics of a magnetoresistive lapping monitor formed in accord with the preferred embodiment of the present invention, in comparison with a magnetoresistive lapping monitor having incorporated therein a rectangular magnetoresistive (MR) layer as is more conventionally employed within the art of magnetoresistive (MR) sensor element fabrication and magnetoresistive (MR) lapping monitor fabrication.

As is more conventionally employed within the art of magnetoresistive (MR) sensor element fabrication and magnetoresistive (MR) lapping monitor fabrication, a magnetoresistive (MR) lapping monitor employing a rectangular patterned magnetoresistive (MR) layer with patterned conductor lead layers extending all the way to an air bearing surface (ABS) edge of the magnetoresistive (MR) lapping monitor is both conventional and readily mathematically analyzed. A schematic plan view diagram of such a magnetoresistive (MR) lapping monitor is illustrated within FIG. 5, where there is illustrated a patterned magnetoresistive (MR) layer 30 having a pair of patterned conductor lead layers 32a and 32b formed upon a pair of opposite ends of the patterned magnetoresistive (MR) layer 30 and extending to an air bearing surface (ABS) edge 34 of the patterned magnetoresistive (MR) layer 30. Within the magnetoresistive (MR) lapping monitor whose schematic plan view diagram is illustrated within FIG. 5, a measured resistance R of the patterned magnetoresistive (MR) layer 30 is related to a stripe-height h of the patterned magnetoresistive (MR) layer 30 and a length l of the patterned magnetoresistive (MR) layer 30 in accord with equation 1, as follows.

$$R = Ql/h \tag{1}$$

Within equation 1, $Q = \rho/t$ (resistivity divided by film thickness), and Q is defined as the sheet-resistance of the patterned magnetoresistive (MR) layer 30.

As is illustrated within equation 1, the resistance R of a patterned magnetoresistive (MR) layer within a magnetoresistive (MR) lapping monitor is inversely proportional to the stripe-height h of the patterned magnetoresistive (MR) layer within the magnetoresistive (MR) lapping monitor. Nonetheless, to be optimally useful within a magnetoresistive (MR) lapping monitor, the resistance R of the patterned magnetoresistive (MR) layer within the magnetoresistive (MR) lapping monitor must also have an optimal sensitivity of a change in the resistance R to a change in stripe-height h of the patterned magnetoresistive (MR) layer. Such a sensitivity of a change in resistance R of a patterned magnetoresistive (MR) layer to a change in stripe-height h of the patterned magnetoresistive (MR) layer is obtained by differentiating equation 1 to provide equation 1A, as follows.

$$dR/dh = -Ql/h^2 \tag{1A}$$

With respect to equation 1A, it is noted that the sensitivity dR/dh, which is a measure of the stripe-height h resolution, is inversely proportional to the square of an instantaneous stripe-height h. Thus, as a stripe-height h reduces during lapping, the resistance R of the patterned magnetoresistive (MR) layer becomes a more sensitive measure of the stripe-height h of the patterned magnetoresistive (MR) layer. Similarly, as is also illustrated within equation 1A, the sensitivity of a patterned magnetoresistive (MR) layer with respect to a stripe-height h of the patterned magnetoresistive (MR) layer is nonlinear. For comparison purposes, a magnetoresistive (MR) lapping monitor with a linear sensitivity would be characterized by equation (1B), as follows.

$$dR/dh = \text{constant} \tag{1B}$$

Figure 5:
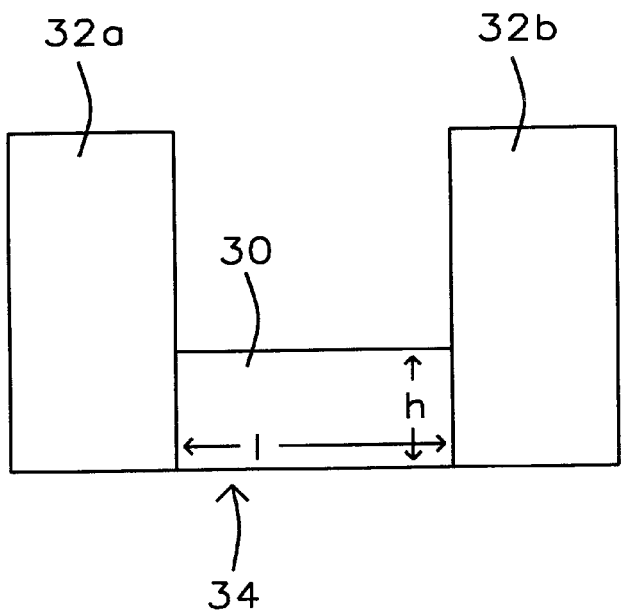
FIG. 5 shows a schematic plan view diagram of a magnetoresistive (MR) lapping monitor conventional in the art of magnetoresistive (MR) sensor element fabrication.

Within a magnetoresistive (MR) lapping monitor, a modest level of non-linearity is desirable, since it is desirable to define with optimal sensitivity a final stripe-height h of a patterned magnetoresistive (MR) layer within the magnetoresistive (MR) lapping monitor. However extreme non-linearity of sensitivity is undesirable within a magnetoresistive (MR) lapping monitor since extreme non-linearity might compromise process control when lapping the magnetoresistive lapping monitor at an initial stripe-height h and an intermediate stripe-height h of the patterned magnetoresistive (MR) layer within the magnetoresistive (MR) lapping monitor. If, for example, the stripe-height h of the patterned magnetoresistive (MR) layer 30 may not be monitored with adequate sensitivity at all process points when lapping the magnetoresistive (MR) lapping monitor whose schematic plan view diagram is illustrated in FIG. 5 (i.e. in particular before the stripe-height h becomes exceedingly low), a uniform and accurate final stripe-height h of the patterned magnetoresistive (MR) layer is often unachievable. Therefore severe lack of linearity of resistance R with respect to stripe-height h of a patterned magnetoresistive (MR) layer within a magnetoresistive lapping monitor should be avoided.

Thus, the lapping process when employed for lapping a magnetoresistive (MR) lapping monitor is typically limited to a finite range a stripe-height h of a patterned magnetoresistive (MR) layer within the magnetoresistive (MR) lapping monitor. Typically and preferably, the magnetoresistive lapping process laps off from about 5 to about 10 microns of a patterned magnetoresistive (MR) layer within a magnetoresistive (MR) lapping monitor before the stripe-height h profile of a series of patterned magnetoresistive (MR) layers within a series of corresponding magnetoresistive (MR) lapping monitors converges to a desired value of sensitivity. By way of example, and without limitation, for a final stripe-height h of a patterned magnetoresistive (MR) layer within a magnetoresistive (MR) lapping monitor of about 0.5 microns, and an initial stripe-height h of the patterned magnetoresistive (MR) layer within the magnetoresistive (MR) lapping monitor of about 5.0 microns, equation 1A dictates that a sensitivity of resistance R with respect to stripe height h for a patterned magnetoresistive (MR) layer increases about 100 times during lapping of the patterned magnetoresistive (MR) layer. Thus, if a sensitivity for lapping a patterned magnetoresistive (MR) layer within a magnetoresistive (MR) lapping monitor is optimal near the a final stripe height h when lapping the patterned magnetoresistive (MR) layer, a corresponding initial sensitivity may be inadequate when initiating lapping of the patterned magnetoresistive (MR) layer.

It is feasible to enhance linearity when lapping a patterned magnetoresistive (MR) layer within a magnetoresistive (MR) sensor element by sacrificing sensitivity when lapping a corresponding patterned magnetoresistive (MR) layer within a magnetoresistive (MR) lapping monitor lapped simultaneously with the magnetoresistive (MR) sensor element. Such enhanced linearity may be achieved by enlarging a patterned magnetoresistive (MR) layer within the magnetoresistive (MR) lapping monitor with respect to a corresponding patterned magnetoresistive (MR) layer within the magnetoresistive (MR) sensor element, in a direction of increasing stripe-height h. For example, a patterned magnetoresistive (MR) layer within a magnetoresistive (MR) lapping monitor may be made 9.5 microns in stripe height h higher than a corresponding patterned magnetoresistive (MR) layer within a magnetoresistive (MR) sensor element, so that the patterned magnetoresistive (MR) layer within the magnetoresistive (MR) sensor element is lapped to 10 microns height, while the corresponding patterned magnetoresistive MR layer within the magnetoresistive (MR) sensor element is lapped to a desired 0.5 microns stripe-height. When lapping begins, the stripe-height h of the patterned magnetoresistive layer within the magnetoresistive lapping monitor would be 19.5 microns high, and the corresponding patterned magnetoresistive (MR) layer within the magnetoresistive sensor element would be 10 microns high. Under such circumstances, the stripe height h of the patterned magnetoresistive (MR) layer within the magnetoresistive lapping monitor is reduced by a factor of approximately 2 (i.e. 19.5/10) during lapping and thus the sensitivity of the patterned magnetoresistive (MR) layer within the magnetoresistive (MR) lapping monitor increases by a factor of only about 4 during lapping (i.e. 22). Although the linearity is clearly improved, the final stripe-height h sensitivity of the patterned magnetoresistive (MR) layer within the magnetoresistive (MR) lapping monitor may become inadequate at 10 microns stripe height.

Analogously with the foregoing discussion, it is also feasible to improve a final stripe-height h sensitivity of a patterned magnetoresistive (MR) layer within a magnetoresistive (MR) lapping monitor at the expense of linearity. To achieve such a result, there is displaced a patterned magnetoresistive (MR) layer within a magnetoresistive (MR) lapping monitor with respect to a corresponding patterned magnetoresistive (MR) layer within a magnetoresistive (MR) sensor element lapped simultaneously with the magnetoresistive (MR) lapping monitor in a direction of decreasing stripe-height h. For example, a patterned magnetoresistive (MR) layer within a magnetoresistive (MR) lapping monitor may be positioned 0.4 micron lower than a corresponding patterned magnetoresistive (MR) layer within a magnetoresistive (MR) sensor element lapped simultaneously with the magnetoresistive (MR) lapping monitor, so that the patterned magnetoresistive (MR) layer within the magnetoresistive (MR) lapping monitor is lapped to 0.1 micron stripe height h, while the corresponding patterned magnetoresistive (MR) layer within the magnetoresistive (MR) sensor element is lapped to a desired 0.5 micron stripe height h. In accord with equation 1A, it is seen that a reduction of final stripe height h of the patterned magnetoresistive (MR) layer within the magnetoresistive (MR) lapping monitor by a factor of 5 (i.e. 0.5/0.1) increases the stripe-height sensitivity when lapping the patterned magnetoresistive (MR) layer by a factor of 25 (i.e. 52). Unfortunately, however, linearity is similarly compromised by a factor of 25 as well.

The foregoing discussion indicates that by manipulating a final stripe-height h of a patterned magnetoresistive (MR) layer within a magnetoresistive (MR) lapping monitor the final sensitivity of the patterned magnetoresistive (MR) layer and the linearity of the final stripe height h with respect resistance R of the patterned magnetoresistive (MR) layer simultaneously vary inversely. In summary, decreasing the final stripe-height h improves the final sensitivity, while amplifying the nonlinearity. Increasing the final stripe-height h effects a complementary result.

An inability to separately adjust within a rectangular patterned magnetoresistive (MR) layer a final stripe-height h sensitivity and a final stripe height linearity derives, at least in part, from a limited number of design parameters which are typically employed for defining a conventional rectangular patterned magnetoresistive (MR) layer within a magnetoresistive (MR) lapping monitor. In that regard, a conventional rectangular patterned magnetoresistive (MR) layer employed within a magnetoresistive (MR) lapping monitor often has only three design parameters, Q, l, and h. Of these three design parameters, Q is often dictated by factors other than those related to a magnetoresistive (MR) lapping monitor design. Thus, this leaves only two design parameters, l and h, which are allowed for controlling sensitivity and linearity within a patterned magnetoresistive (MR) layer within a magnetoresistive (MR) lapping monitor.

However there are typically, at minimum, employed three design constraints when designing and fabricating a patterned magnetoresistive (MR) layer within a magnetoresistive (MR) lapping monitor. The three design constraints are as follows:

1. A final resistance, Rmax, of a patterned magnetoresistive (MR) layer after lapping shall not exceed a range of a detection circuit, which is typically an ohmmeter;
2. A final sensitivity of resistance R to stripe-height h, dR/dh, shall be no less than a prescribed value Sfinal; and
3. An initial sensitivity of resistance R to stripe-height h, dR/dh, shall be no less than a prescribed value Sinitial.

From the difference of the stripe height h at the final sensitivity and the stripe height h at the initial sensitivity there is determined a usable range of the patterned magnetoresistive (MR) layer within the magnetoresistive (MR) lapping monitor.

Since it is not feasible to accommodate the above three design constraints within merely two design parameters, it is common within the art of magnetoresistive (MR) lapping monitor fabrication to satisfy only the first two of the above design constraints. This alternative approach may be employed to completely define a patterned magnetoresistive (MR) layer within a magnetoresistive (MR) lapping monitor. The usable range may then be calculated or approximated. When only the first two of the above three design constraints are satisfied, a final stripe-height h within a magnetoresistive (MR) lapping monitor is given by equation 2, as follows.

$$hfinal = Rmax/Sfinal \qquad (2)$$

Simlarly, under such circumstances the stripe-length l is given by equation 2A as follows.

$$l = Rmax \times hfinal/Q \qquad (2A)$$

A rectangular patterned magnetoresistive (MR) layer within a magnetoresistive (MR) lapping monitor is thus completely defined. Finally, the usable range is calculated in accord with equation 2B as follows.

$$D = hfinal \times (sqrt(Sfinal/Sinitial) - 1) \qquad (2B)$$

In accord with the foregoing discussion, it is not feasible when employing a rectangular patterned magnetoresistive (MR) layer within a magnetoresistive (MR) lapping monitor to increase a usable range D, absent compromise of a final resistance and/or a final sensitivity.

Figure 6:
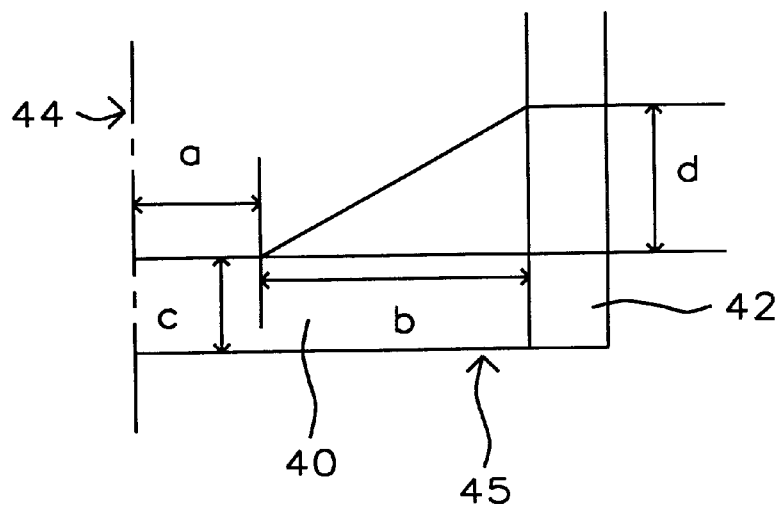
FIG. 6 shows a schematic plan view diagram of a magnetoresistive (MR) lapping monitor employed for mathematical modeling of the magnetoresistive (MR) lapping monitor of the preferred embodiment of the present invention.

Referring now to FIG. 6, there is shown a schematic plan view diagram of a magnetoresistive (MR) lapping monitor which may be employed to model and facilitate a mathematical analysis of a magnetoresistive (MR) lapping monitor fabricated in accord with the preferred embodiment of the present invention, as illustrated within the schematic plan view diagram of FIG. 1. Shown in FIG. 6 is a butterfly patterned magnetoresistive (MR) layer 40 having a patterned conductor lead layer 42 at one of its ends and extending to an air bearing surface (ABS) edge 45 of the butterfly patterned magnetoresistive (MR) layer 42, where the butterfly patterned magnetoresistive (MR) layer 40 and the patterned conductor lead layer 42 are viewed within the context of a mirror image plane of symmetry 44. As is illustrated within the schematic plan view diagram of FIG. 6, within the butterfly patterned magnetoresistive (MR) layer 40 there are four design parameters (i.e. a, b, c, and d) which may be employed for defining the butterfly patterned magnetoresistive (MR) layer 40 in comparison with two design parameters (l and h) which are employed when fabricating the rectangular patterned magnetoresistive (MR) layer 30 within the magnetoresistive (MR) lapping monitor whose schematic plan view diagram is illustrated in FIG. 5. Thus all three of the design constraints as noted above for fabricating a patterned magnetoresistive (MR) layer within a magnetoresistive (MR) lapping monitor may be accommodated when fabricating the magnetoresistive (MR) lapping monitor whose schematic plan view diagram is illustrated in FIG. 6 in comparison with the magnetoresistive (MR) lapping monitor whose schematic plan view diagram is illustrated in FIG. 5. In addition, there may also be accommodated a fourth design constraint, such as but not limited to b=2d, in order to ensure that an angle of concavity within the butterfly patterned magnetoresistive (MR) layer 40 as illustrated within the schematic plan view diagram of FIG. 6 is sufficiently large (oblique) to minimize an effect of a corner-rounding on the butterfly patterned magnetoresistive (MR) layer 40 measured resistance. Within the butterfly patterned magnetoresistive (MR) layer 40 within the magnetoresistive (MR) lapping monitor whose schematic plan view diagram is illustrated within FIG. 6 the design parameter c corresponds with the design parameter h within the rectangular patterned magnetoresistive (MR) layer within the magnetoresistive lapping monitor whose schematic plan view diagram is illustrated in FIG. 5.

For the magnetoresistive (MR) lapping monitor whose schematic plan view diagram is illustrated in FIG. 6, the relationship of resistance as a function of design parameters is given by equation 3, as follows.

$$R = Q(a/c + b/d \ln(1 + d/c)) \qquad (3)$$

When the patterned conductor lead layer 42 does not extend to the air bearing surface (ABS) of the butterfly patterned magnetoresistive (MR) layer 40 within the magnetoresistive (MR) lapping monitor whose schematic plan view diagram is illustrated in FIG. 6, an exact equation relating resistance R to the remaining four design parameters becomes complex. The simplified equation 3 may be employed as a preliminary design tool, with more complicated equations being employed at a later point in design and fabrication of a magnetoresistive (MR) lapping monitor in accord with the magnetoresistive (MR) lapping monitor whose schematic plan view diagram is illustrated in FIG. 6.

Similarly, limitations for the design parameters a, b, c and d are not derived explicitly to meet all four design constraints, since solution of four equations directed towards all four design parameters is lengthy and complex in analytically closed form. As an approximation, simultaneous solution may be obtained more readily for the four design parameters through iterative solution of appropriate equations, and such iterative solution may be facilitated employing computer assisted iteration. Specific details are omitted, since although iterative methods are somewhat routine they are nonetheless lengthy.

A more accurate empirical equation for stripe-height h, which may be employed when analyzing both the rectangular patterned magnetoresistive (MR) layer 30 within the magnetoresistive lapping monitor whose schematic plan view diagram is illustrated in FIG. 5 and the butterfly patterned magnetoresistive (MR) layer 40 within the magnetoresistive lapping monitor whose schematic plan view diagram is illustrated in FIG. 6 is given by equation 4, as follows.

$$h = \kappa(R-\alpha)^\beta - \gamma \tag{5}$$

Within equation 5, $\kappa$, $\alpha$, $\beta$, and $\gamma$ are constants. Equation 5 can be used to calculate stripe-height h during lapping.

EXAMPLES

For a rectangular patterned magnetoresistive (MR) layer within a magnetoresistive (MR) lapping monitor analogous or equivalent to the magnetoresistive (MR) lapping monitor whose schematic plan view diagram is illustrated in FIG. 5, under conditions where: (1) Rmax=2000 ohms; (2) Sfinal= 2000 ohms per micron; and (3) Sinitial=20 ohms per micron, there is calculated a stripe-height hmin of 1.0 micron and a range D of 9.9 microns predicated upon a acceptable maximum sheet resistance Q of 40 ohms per square and a patterned magnetoresistive (MR) layer length l of 50 microns.

Under conditions where a final stripe height sensitivity Sfinal is desired to be 2600 ohms per micron while the sheet resistance Q remains constant, and also assuming a rectangular patterned magnetoresistive (MR) layer, hmin is reduced to 0.77 microns, the range D is reduced to 8.0 microns and the length l is reduced to 38.5 microns.

Within the context of a magnetoresistive (MR) lapping monitor in accord with the preferred embodiment of the present invention as illustrated within FIG. 6 and modeled in accord with equation 4, a final sensitivity of 2600 ohms per micron may be achieved employing a=2.5 microns, b=35 microns, c=0.5 microns (corresponding with hmin) and d=2.6 microns. When employing these values for the design parameters a, b, c and d, there is no reduction in range of the magnetoresistive (MR) lapping monitor and the initial sensitivity of the magnetoresistive (MR) lapping monitor actually increases slightly (approximately 4.5%) over a magnetoresistive (MR) lapping monitor employing a rectangular patterned magnetoresistive (MR) layer.

As an alternative example, it is also possible to accept a reduction in range in exchange for an optimized final sensitivity. For example, if a=10.0 microns, b=15.0 microns, c=0.5 microns and d=8.75 microns, Sfinal is increased to 3460 ohms per micron and the range D is reduced to 7.8 microns.

Either of the foregoing two examples of a magnetoresistive (MR) lapping monitor employing a butterfly patterned magnetoresistive (MR) layer in accord with the preferred embodiment of the present invention provides superior performance in comparison with a magnetoresistive (MR) lapping monitor employing a rectangular patterned magnetoresistive (MR) layer. Within the first example of the magnetoresistive (MR) lapping monitor employing the butterfly patterned magnetoresistive (MR) layer the final sensitivity is matched, but the range is increased by over 25 percent. Similarly, within the second example of the magnetoresistive (MR) lapping monitor employing the butterfly patterned magnetoresistive (MR) layer, the usable range is matched, but the final resolution is improved by about 33 percent.

The above mathematical analysis and examples do not include lead layer resistance, which incorporates a resistance from the modeled geometry to the conductive leads. Since the invention employs a butterfly patterned magnetoresistive (MR) layer which inherently has an increased lead area and thus lower lead resistance than a rectangular patterned magnetoresistive (MR) layer, actual benefits of a magnetoresistive (MR) lapping monitor fabricated in accord with the present invention may be enhanced.

As is understood by a person skilled in the art, although the foregoing preferreed embodiment, mathematical analysis and example of the present innvention are predicated primarily upon a description of a patterned magnetoresistive (MR) layer within a magnetoresistive (MR) lapping monitor, where the patterned magnetoresistive (MR) layer within the magnetoresistive (MR) lapping monitor has a polygonal straight sided concavity within an edge of the patterned magnetoresistive (MR) layer opposite an air bearing surface edge of the patterned magnetoresistive (MR) layer, there may be substituted for the polygonal straight sided concavity within the patterned magnetoresistive (MR) layer a concavity defined by one or more curved segments while still providing the features of the present invention, which at least in part include providing a decreasing effective sensing length of a patterned magnetoresistive (MR) layer within a magnetoresistive (MR) lapping monitor during lapping of the patterned magnetoresistive (MR) layer within the magnetoresistive (MR) lapping monitor.

As is understood by a person skilled in the art, the preferred embodiment and examples of the present invention are illustrative of the present invention rather than limiting of the present invention. Revisions and modifications may be made to materials, structures and dimensions through which is provided a magnetoresistive (MR) sensor element and a magnetoresistive (MR) lapping monitor in accord with the preferred embodiment and examples of the present invention while still providing a magnetoresistive (MR) sensor element and a magnetoresistive (MR) lapping monitor in accord with the spirit and scope of the present invention, as defined by the following claims.

What is claimed is:

1. A method for forming a magnetoresistive (MR) stripe height lapping monitor comprising:

providing a substrate;

forming over the substrate a patterned magnetoresistive (MR) layer to serve as a stripe height lapping monitor element, the patterned magnetoresistive (MR) layer having a concavity at an edge of the patterned magnetoresistive (MR) layer opposite an air bearing surface (ABS) edge of the patterned magnetoresistive (MR) layer; and forming, covering the edge of the patterned magnetoresistive (MR) layer opposite the air bearing surface edge of the patterned magnetoresistive (MR) layer and separated by the concavity, a pair of patterned conducting lead layers for said stripe height lapping monitor element, where neither patterned conductor lead layer within the pair of patterned conductor lead layers reaches a plane defined by the air bearing surface (ABS) edge of the patterned magnetoresistive (MR) layer.

2. The method of claim 1 wherein by forming the pair of patterned conducting lead layers for the stripe height lapping monitor element such that neither patterned conductor lead layer within the pair of patterned conductor lead layers reaches the plane defined by the air bearing surface (ABS) edge of the patterned magnetoresistive (MR) layer serving as the stripe height lapping monitor element, there is avoided a smearing of the patterned conductor lead layers when lapping the air bearing surface (ABS) edge of the patterned magnetoresistive (MR) layer serving as the stripe height lapping monitor element.

3. The method of claim 1 wherein:

the concavity is selected from the group of concavities consisting of a "U" shaped concavity, a "U" shaped concavity with outwardly sloped sidewalls, a "V"

shaped concavity and a "V" shaped concavity with a flattened bottom; and neither patterned conductor lead layer within the pair of patterned conductor lead layers reaches to a minimum height of the patterned magnetoresistive (MR) layer within the concavity.

4. A method for forming a magnetoresistive (MR) sensor element comprising:

providing a substrate;

forming over the substrate a first patterned magnetoresistive (MR) layer employed within a magnetoresistive (MR) sensor element and a second patterned magnetoresistive (MR) layer employed within a magnetoresistive (MR) lapping monitor, the first patterned magnetoresistive (MR) layer having a first air bearing surface (ABS) edge parallel with a second air bearing surface edge of the second patterned magnetoresistive (MR) layer, where the second patterned magnetoresistive (MR) layer has a concavity at an edge of the second patterned magnetoresistive (MR) layer opposite the second air bearing surface (ABS) edge of the second patterned magnetoresistive (MR) layer;

forming covering a pair of opposite ends of the first patterned magnetoresistive (MR) layer separated the first air bearing surface (ABS) edge of the first patterned magnetoresistive (MR) layer a pair of first patterned conductor lead layers while simultaneously forming covering the edge of the second patterned magnetoresistive (MR) layer opposite the air bearing surface edge of the second patterned magnetoresistive (MR) layer and separated by the concavity a pair of second patterned conductor lead layers, where neither second patterned conductor lead layer within the pair of second patterned conductor lead layers reaches a second plane defined by the second air bearing surface (ABS) edge of the second patterned magnetoresistive (MR) layer; and lapping simultaneously the first air bearing surface (ABS) edge of the first patterned magnetoresistive (MR) layer and the second air bearing surface (ABS) edge of the second patterned magnetoresistive (MR) layer.

5. The method of claim 4 wherein each of the first patterned conductor lead layers within the pair of first patterned conductor lead layers reaches a first plane defined by the first air bearing surface (ABS) edge of the first patterned magnetoresistive (MR) layer.

6. The method of claim 4 wherein by forming the pair of second patterned conductor lead layers such that neither second patterned conductor lead layer within the pair of second patterned conductor lead layers reaches the second plane defined by the second air bearing surface (ABS) edge of the second patterned magnetoresistive (MR) layer there is avoided a smearing of the second patterned conductor lead layers when lapping the second air bearing surface (ABS) edge of the second patterned magnetoresistive (MR) layer.

7. The method of claim 5 wherein:

the concavity is selected from the group of concavities consisting of a "U" shaped concavity, a "U" shaped concavity with outwardly sloped sidewalls, a "V" shaped concavity and a "V" shaped concavity with a flattened bottom; and neither second patterned conductor lead layer within the pair of second patterned conductor lead layers reaches to a minimum height of the second patterned magnetoresistive (MR) layer within the concavity.

8. A method for forming a magnetoresistive (MR) lapping monitor comprising:

providing a substrate;

forming over the substrate a patterned magnetoresistive (MR) layer, the patterned magnetoresistive (MR) layer having a concavity at an edge opposite an air bearing surface (ABS) edge of the patterned magnetoresistive (MR) layer, said concavity being "V" shaped and having a flattened bottom, wherein the sidewalls of the "V" form an angle $\Phi$ of between about 140 degrees and 175 degrees with said flattened bottom;

forming a pair of patterned conducting lead layers covering the edge of the patterned magnetoresistive (MR) layer and separated by said "V" shaped concavity, wherein neither patterned conducting lead layer reaches to a minimum height of the patterned magnetoresistive (MR) layer within the "V" shaped concavity and wherein an inner edge of each patterned conductor lead layer makes an angle $\Theta$ with the sidewall of the "V," $\Theta$ being approximately $\Phi/2$ and, further, wherein neither patterned conducting lead layer reaches the plane defined by the air bearing surface (ABS) edge of the patterned magnetoresistive (MR) layer, thereby avoiding a smearing of said lead layers when lapping the air bearing surface (ABS) edge of the patterned magnetoresistive (MR) layer.

9. A method for forming a magnetoresistive (MR) sensor element comprising:

providing a substrate;

forming over the substrate a first patterned magnetoresistive (MR) layer employed within a magnetoresistive sensor element and a second patterned magnetoresistive (MR) layer employed within a magnetoresistive (MR) lapping monitor, the first patterned magnetoresistive (MR) layer having a first air bearing surface (ABS) edge parallel with an air bearing surface edge of the second patterned magnetoresistive (MR) layer, where the second patterned magnetoresistive layer has a "V" shaped concavity with a flattened bottom at an edge opposite the air bearing surface edge of said second patterned magnetoresistive layer;

forming a first pair of patterned conducting lead layers on the opposite edges of the air bearing surface of the first patterned magnetoresistive layer wherein each such lead layer reaches a plane defined by the air bearing surface edge of said first magnetoresistive layer, while simultaneously forming a second pair of patterned conducting lead layers on the opposite edges of the second patterned magnetoresistive layer covering the edges of said patterned magnetoresistive (MR) layer and being separated by said "V" shaped concavity, wherein neither patterned conducting lead layer reaches the plane defined by the air bearing surface of the second magnetoresistive layer nor does either patterned conducting lead layer reach to a minimum height of the patterned magnetoresistive (MR) layer within the "V" shaped concavity and wherein an inner edge of each patterned conductor lead layer makes an angle $\Theta$ with the sidewall of the "V," $\Theta$ being approximately $\Phi/2$ and, further, wherein neither patterned conducting lead layer reaches the plane defined by the air bearing surface (ABS) edge of the patterned magnetoresistive (MR) layer, thereby avoiding a smearing of said lead layers when lapping the air bearing surface (ABS) edge of the patterned magnetoresistive (MR) layer;

lapping, simultaneously, the air bearing surface (ABS) edge of the first patterned magnetoresistive layer and the air bearing surface (ABS) edge of the second patterned magnetoresistive layer.

* * * * *